(12) United States Patent
Sung et al.

(10) Patent No.: US 11,648,908 B2
(45) Date of Patent: May 16, 2023

(54) ROOF AIR BAG APPARATUS FOR VEHICLE

(71) Applicants: HYUNDAI MOTOR COMPANY, Seoul (KR); KIA CORPORATION, Seoul (KR); HYUNDAI MOBIS CO., LTD., Seoul (KR)

(72) Inventors: Il Chang Sung, Hwaseong-si (KR); Hae Kwon Park, Yongin-si (KR); Byung Ho Min, Yongin-si (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/399,383

(22) Filed: Aug. 11, 2021

(65) Prior Publication Data

US 2022/0144203 A1  May 12, 2022

(30) Foreign Application Priority Data

Nov. 10, 2020  (KR) .................. 10-2020-0149456

(51) Int. Cl.
*B60R 21/214*  (2011.01)
*B60R 21/213*  (2011.01)

(52) U.S. Cl.
CPC .......... *B60R 21/214* (2013.01); *B60R 21/213* (2013.01)

(58) Field of Classification Search
CPC ............. B60R 21/213; B60R 21/214; B60R 2021/23192
See application file for complete search history.

(56) References Cited

U.S. PATENT DOCUMENTS

| 2,834,606 | A | * | 5/1958 | Bertrand | B60R 21/268 |
| | | | | | D12/400 |
| 5,775,726 | A | * | 7/1998 | Timothy | B60R 13/0212 |
| | | | | | 280/730.1 |
| 6,189,960 | B1 | * | 2/2001 | Mumura | B60R 21/214 |
| | | | | | 180/281 |
| 11,104,291 | B1 | * | 8/2021 | Dennis | B60R 21/214 |
| 11,535,185 | B2 | * | 12/2022 | Fischer | B60R 21/214 |
| 2004/0090050 | A1 | * | 5/2004 | Dominissini | B60R 21/213 |
| | | | | | 280/730.1 |
| 2011/0057423 | A1 | * | 3/2011 | Tago | F16B 19/1081 |
| | | | | | 24/457 |

(Continued)

FOREIGN PATENT DOCUMENTS

| DE | 10007343 A1 | * | 8/2001 | ........... B60R 21/231 |
| DE | 10019894 A1 | * | 10/2001 | ........... B60R 21/214 |

(Continued)

*Primary Examiner* — Barry Gooden, Jr.
(74) *Attorney, Agent, or Firm* — Lempia Summerfield Katz LLC

(57) ABSTRACT

A roof air bag apparatus for a vehicle includes a roof air bag cushion protecting a passenger, and the roof air bag cushion can be separated into a front air bag cushion and a rear air bag cushion. In particular, the front air bag cushion and the rear air bag cushion are unfolded into a space between a front passenger and a rear passenger in a face-to-face mode at the time of occurrence of a car accident, such that the unfolded front air bag cushion protects the front passenger by absorbing an impact force, and the unfolded rear air bag cushion protects the rear passenger by absorbing an impact force.

12 Claims, 7 Drawing Sheets

(56) References Cited

U.S. PATENT DOCUMENTS

| | | | |
|---|---|---|---|
| 2012/0133114 A1* | 5/2012 | Choi | B60R 21/214 |
| | | | 280/728.2 |
| 2015/0203066 A1* | 7/2015 | Pausch | B60R 21/232 |
| | | | 280/730.1 |
| 2017/0225641 A1* | 8/2017 | Faruque | B60N 2/143 |
| 2018/0229681 A1* | 8/2018 | Jaradi | B60R 21/2165 |
| 2019/0202391 A1* | 7/2019 | Cho | B60R 21/233 |
| 2019/0217804 A1* | 7/2019 | Cho | B60R 21/233 |
| 2019/0241148 A1* | 8/2019 | Shin | B60R 21/01512 |
| 2019/0291680 A1* | 9/2019 | Baccouche | B60R 21/213 |
| 2020/0130627 A1* | 4/2020 | Imura | B60R 21/201 |
| 2020/0139923 A1* | 5/2020 | Ostling | B60R 21/233 |
| 2020/0307495 A1* | 10/2020 | Jimenez | B60R 21/232 |
| 2020/0307496 A1* | 10/2020 | Jimenez | B60R 21/2338 |
| 2020/0346607 A1* | 11/2020 | Kim | B60N 2/14 |
| 2020/0384940 A1* | 12/2020 | Sekizuka | B60R 21/26 |
| 2020/0391689 A1* | 12/2020 | Fischer | B60R 21/233 |
| 2020/0406852 A1* | 12/2020 | Fischer | B60R 21/2338 |
| 2021/0009072 A1* | 1/2021 | Hwangbo | B60R 21/01512 |
| 2021/0138996 A1* | 5/2021 | Min | B60R 21/2646 |
| 2021/0197748 A1* | 7/2021 | Jeong | B60R 21/2338 |
| 2021/0276507 A1* | 9/2021 | Min | B60R 21/214 |
| 2021/0394702 A1* | 12/2021 | Farooq | B60R 21/214 |
| 2022/0017036 A1* | 1/2022 | Jeong | B60R 21/214 |
| 2022/0017037 A1* | 1/2022 | Jeong | B60R 21/2338 |
| 2022/0063537 A1* | 3/2022 | Lee | B60R 21/231 |
| 2022/0153223 A1* | 5/2022 | Min | B60R 21/233 |
| 2022/0212620 A1* | 7/2022 | Min | B60R 21/214 |
| 2022/0371540 A1* | 11/2022 | Min | B60R 21/231 |

FOREIGN PATENT DOCUMENTS

| | | | | |
|---|---|---|---|---|
| DE | 10039800 A1 * | 2/2002 | | B60R 21/214 |
| DE | 102019216358 A1 * | 4/2021 | | |
| KR | 10-2019-0138423 A1 | 12/2019 | | |
| WO | WO-2008095615 A1 * | 8/2008 | | B60R 21/214 |
| WO | WO-2018132332 A1 * | 7/2018 | | B60R 21/0136 |

* cited by examiner

ROOF AIR BAG APPARATUS FOR VEHICLE

CROSS REFERENCE TO RELATED APPLICATION

This application claims priority to and the benefit of Korean Patent Application No. 10-2020-0149456, filed Nov. 10, 2020, the entire contents of which are incorporated herein by reference.

FIELD

The present disclosure relates to a roof air bag apparatus for a vehicle, which is capable of more effectively protecting a front passenger and a rear passenger in the vehicle.

BACKGROUND

The statements in this section merely provide background information related to the present disclosure and may not constitute prior art.

As a solution for protecting safety of vehicle passengers, several types of air bag apparatuses are provided in vehicles. Among them, a roof air bag apparatus is mounted on a roof panel of the vehicle, and an air bag cushion is unfolded downward at the time of an accident to protect a passenger.

Meanwhile, an autonomous driving technology is applied to a vehicle (namely, an autonomous vehicle), and the vehicle can travel to a destination without manipulations by a driver, (the driver's manipulations on a steering wheel, an accelerator pedal, a brake pedal, and the like). In recent, the development of the autonomous vehicle has been rapidly conducted.

When an autonomous driving situation is universally realized, the driver may select a mode in which the driver takes a break without directly driving the vehicle while the vehicle is traveling, and in particular, a front passenger and a rear passenger may enjoy conversations in a face-to-face mode in which the front passenger and the rear passenger are seated so as to face each other.

As such, when an accident occurs in a state in which the front passenger and the rear passenger are seated in the face-to-face mode, the air bag cushion constituting the roof air bag apparatus is unfolded between the front passenger and the rear passenger to protect the front passenger and the rear passenger.

However, we have found that in a roof air bag apparatus according to the related art, the air bag cushion is composed of one cushion having a single chamber, such that one air bag cushion is unfolded between the front passenger and the rear passenger. Therefore, when any one of the front passenger and the rear passenger first collides and is in contact with the unfolded air bag cushion, the air bag cushion of the single chamber is strongly pushed to an opposite side while absorbing an impact force. As a result, the passenger on the opposite side is strongly hit by the pushed air bag cushion, such that an injury to the passenger on the opposite side is increased, and in a severe case, an injury that a neck of the passenger on the opposite side is bent backward may occur.

The contents described as the related art have been provided only to assist in understanding the background of the present disclosure and should not be considered as corresponding to the related art known to those having ordinary skill in the art.

SUMMARY

The present disclosure provides a roof air bag apparatus for a vehicle capable of more effectively protecting a front passenger and a rear passenger in a face-to-face mode in which the front passenger and the rear passenger are seated in a state in which they face each other, and capable of minimizing push of an air bag cushion in an opposite direction when any one of the front passenger and the rear passenger collides and is in contact with an unfolded air bag cushion by configuring the air bag cushion using a cushion having two chambers separated into an air bag cushion for the front passenger and an air bag cushion for the rear passenger and resultantly preventing an injury to the passenger due to the unfolded air bag cushion as much as possible.

According to one form of the present disclosure, a roof air bag apparatus for a vehicle includes: a front air bag cushion and a rear air bag cushion that are mounted on a roof of the vehicle in a folded state and are unfolded between a front passenger and a rear passenger by receiving pressures of air bag gases, wherein when an accident occurs in a face-to-face mode in which the front passenger and the rear passenger are seated so as to face each other, the front passenger is protected while being in contact with the unfolded front air bag cushion and the rear passenger is protected while being in contact with the unfolded rear air bag cushion.

The front air bag cushion and the rear air bag cushion may be unfolded at the same time.

The roof air bag apparatus for a vehicle may further include a front inflator and a rear inflator that generate the air bag gases supplied to the front air bag cushion and the rear air bag cushion, respectively, wherein the front inflator and the rear inflator are fixedly mounted on the roof of the vehicle and are configured to be connected to the front air bag cushion and the rear air bag cushion through a front hose and a rear hose, respectively.

The roof air bag apparatus for a vehicle may further include: a front tether coupled to the front air bag cushion to maintain a shape of the front air bag cushion when the front air bag cushion is unfolded; and a rear tether coupled to the rear air bag cushion to maintain a shape of the rear air bag cushion when the rear air bag cushion is unfolded.

The front tether and the rear tether may be cotton tethers formed of a fabric material.

Upper and lower ends of the front air bag cushion and the rear air bag cushion may be configured to be connected to each other.

The roof air bag apparatus for a vehicle may further include: an upper plate and a lower plate which are coupled to connect an upper end of the front air bag cushion and an upper end of the rear air bag cushion and a lower end of the front air bag cushion and a lower end of the rear air bag cushion to each other, respectively; an air bag housing in which the front air bag cushion and the rear air bag cushion are accommodated in the folded state; and an air bag cover which simultaneously covers the front air bag cushion and the rear air bag cushion accommodated in the air bag housing and in which a front tear line and a rear tear line each torn by unfolding pressures of the front air bag cushion and the rear air bag cushion are formed, wherein bolts sequentially penetrate through the air bag cover, the lower plate, the upper plate, and the air bag housing and are then fastened to a roof cross panel coupled to a roof panel, such that the roof air bag apparatus for a vehicle is fixedly installed on the roof of the vehicle.

Bolt holes through which the bolts penetrate may be formed in the upper plate and the lower plate, respectively, a diameter of the bolt holes formed in the upper plate may be larger than a diameter of a screw portion of the bolts and is smaller than a diameter of a head portion of the bolts, and a diameter of the bolt holes formed in the lower plate may be larger than the diameter of the head portion of the bolts.

The roof air bag apparatus for a vehicle may further include: a front leg protecting portion unfolded to extend downwardly from a lower end of the front air bag cushion and a rear leg protecting portion unfolded to extend downwardly from a lower end of the rear air bag cushion, on the basis of a state in which the front air bag cushion and the rear air bag cushion are unfolded, wherein the front leg protecting portion and the rear leg protecting portion are unfolded into a space between knees of the front passenger and the rear passenger to protect the knees and shins of the passengers.

When the front inflator and the rear inflator are exploded or ignited due to an accident in a state in which the front air bag cushion and the rear air bag cushion are folded and accommodated in the air bag housing, such that the air bag gases are generated, the front air bag cushion and the rear air bag cushion may be unfolded by pressures of the air bag gases, the front tear line and the rear tear line of the air bag cover may start to be torn by the unfolding pressures of the front air bag cushion and the rear air bag cushion, and at the same time, the lower plate may be separated while being falling from the bolts; when the lower plate falls from the bolts, the lower end of the front air bag cushion, the lower end of the rear air bag cushion, and the lower plate may be unfolded into a space between the front passenger and the rear passenger in the face-to-face mode by self-weights of the front air bag cushion, the rear air bag cushion, and the lower plate; and the front passenger and the rear passenger may be protected by coming into contact with the unfolded front air bag cushion and rear air bag cushion, respectively.

When the front passenger is in contact with the unfolded front air bag cushion, the front air bag cushion may absorb an impact force while an outer shape of the front air bag cushion is changed, and a phenomenon in which the rear air bag cushion is pushed to a rear at which the rear passenger exists may not occur.

When the rear passenger is in contact with the unfolded rear air bag cushion, the rear air bag cushion may absorb an impact force while an outer shape of the rear air bag cushion is changed, and a phenomenon in which the front air bag cushion is pushed to a front at which the front passenger exists may not occur.

The bolts fastened to the roof cross panel may become cushion hinge portions of the unfolded front air bag cushion and rear air bag cushion, and when the front passenger is in contact with the front air bag cushion or the rear passenger is in contact with the rear air bag cushion at the time of collision of the vehicle, the front air bag cushion and the rear air bag cushion may absorb collision energy while rotating around the cushion hinge portions, such that tension of upper end portions is minimized.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
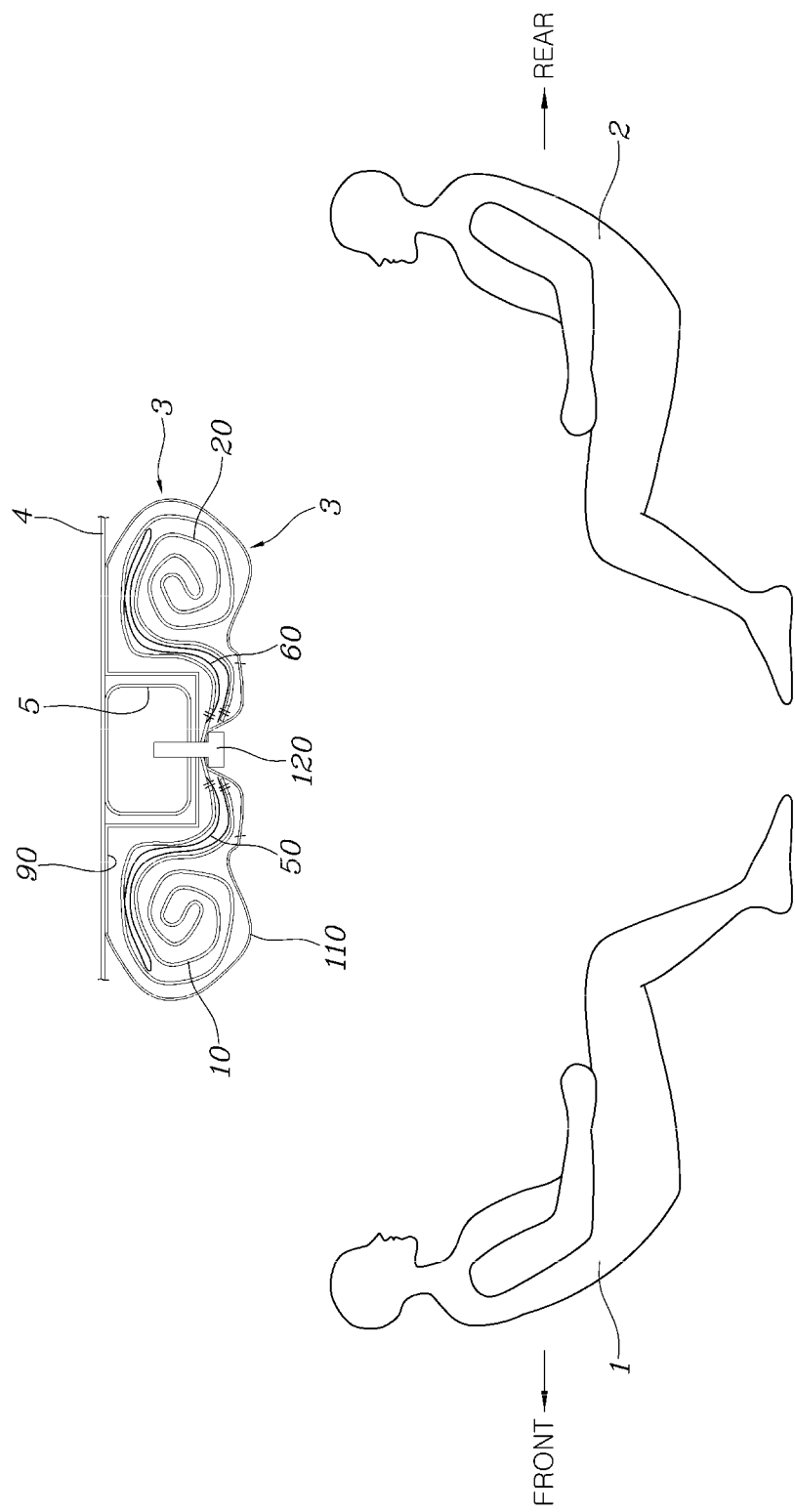
FIG. 1 is a view for describing a roof air bag apparatus for a vehicle in one form of the present disclosure in a state before a front air bag cushion and a rear air bag cushion are unfolded.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Specific structural or functional descriptions will be provided only in order to describe forms of the present disclosure disclosed in the present specification or application. Therefore, forms of the present disclosure may be implemented in various forms, and the present disclosure is not to be interpreted as being limited to forms described in the present specification or application.

Since forms of the present disclosure may be variously modified and may have several forms, specific forms will be illustrated in the accompanying drawings and will be described in detail in the present specification or application. However, it is to be understood that the present disclosure is not limited to specific forms, but includes all modifications, equivalents, and substitutions falling in the spirit and the scope of the present disclosure.

Terms such as 'first', 'second', and the like, may be used to describe various components, but the components are not to be construed as being limited to the terms. The terms are used only to distinguish one component from another component. For example, a 'first' component may be referred to as a 'second' component and a 'second' component may be similarly referred to as a 'first' component, without departing from the scope of the present disclosure.

It is to be understood that when one component is referred to as being "connected to" or "coupled to" another component, one component may be connected directly to or coupled directly to another component or be connected to or coupled to another component with the other component interposed therebetween. On the other hand, it is to be understood that when one component is referred to as being "connected directly to" or "coupled directly to" another component, it may be connected to or coupled to another component without the other component interposed therebetween. Other expressions describing a relationship between components, that is, "between", "directly between", "neighboring to", "neighboring directly to", and the like, are to be similarly interpreted.

Terms used in the present specification are used only in order to describe specific forms rather than limiting the present disclosure. Singular forms are intended to include plural forms unless the context clearly indicates otherwise. It is to be understood that terms "include" or "have" used in the present specification specify the presence of stated features, numerals, steps, operations, components, parts, or combinations thereof, but do not exclude the presence or addition of one or more other features, numerals, steps, operations, components, parts, or combinations thereof.

Unless indicated otherwise, it is to be understood that all the terms used herein including technical and scientific terms have the same meaning as those generally understood by those skilled in the art to which the present disclosure pertains. Terms defined by a generally used dictionary are to be interpreted as having meanings identical with meanings within a context of the related art, and are not interpreted as having ideal or excessively formal meanings unless explicitly defined in the present specification.

A controller according to one form of the present disclosure may be implemented through a non-volatile memory (not illustrated) configured to store data on an algorithm configured to control operations of various components of a vehicle or software instructions reproducing the algorithm and a processor (not illustrated) configured to perform operations to be described below using the data stored in the non-volatile memory. Here, the memory and the processor may be implemented as individual chips. Alternatively, the memory and the processor may be integrated with each other and implemented as a single chip. The processor may have a form of one or more processors.

Hereinafter, a roof air bag apparatus for a vehicle according to an exemplary form of the present disclosure will be described with reference to the accompanying drawings.

The roof air bag apparatus for a vehicle according to the present disclosure is configured so that an air bag cushion constituting the roof air bag apparatus is unfolded between a front passenger 1 and a rear passenger 2 to protect the front passenger 1 and the rear passenger 2 when an accident occurs in a face-to-face mode in which the front passenger 1 and the rear passenger 2 are seated in a state in which they face each other, as illustrated in FIGS. 1 to 7.

In one form, the roof air bag apparatus 3 includes: a front air bag cushion 10 and a rear air bag cushion 20 that are mounted on a roof of the vehicle in a folded state and are unfolded between the front passenger 1 and the rear passenger 2 by receiving pressures of air bag gases, wherein when an accident occurs in a face-to-face mode in which the front passenger 1 and the rear passenger 2 are seated so as to face each other, the front passenger 1 is protected while being in contact with the unfolded front air bag cushion 10 and the rear passenger 2 is protected while being in contact with the unfolded rear air bag cushion 20.

That is, in the roof air bag apparatus 3, the air bag cushion for protecting a passenger is separated into the front air bag cushion 10 and the rear air bag cushion 20, and the front air bag cushion 10 and the rear air bag cushion 20 independently protect the front passenger 1 and the rear passenger 2, respectively.

In one form, the front air bag cushion 10 and the rear air bag cushion 20 are unfolded at the same time, and may be configured to be sequentially unfolded with a time difference, if desired.

In another form, the roof air bag apparatus 3 further includes a front inflator 30 and a rear inflator 40 that generate air bag gases supplied to the front air bag cushion 10 and the rear air bag cushion 20, respectively, wherein the front inflator 30 and the rear inflator 40 are fixedly mounted on the roof of the vehicle and are configured to be connected to the front air bag cushion 10 and the rear air bag cushion 20 through a front hose 31 and a rear hose 41, respectively.

In addition, the roof air bag apparatus 3 further includes a front tether 50 coupled to the front air bag cushion 10 to maintain a shape of the front air bag cushion 10 when the front air bag cushion 10 is unfolded and a rear tether 60 coupled to the rear air bag cushion 20 to maintain a shape of the rear air bag cushion 20 when the rear air bag cushion 20 is unfolded.

The front tether 50 and the rear tether 60 are cotton tethers formed of a fabric material, are folded together with the front air bag cushion 10 and the rear air bag cushion 20 when the front air bag cushion 10 and the rear air bag cushion 20 are folded, and are unfolded together with the front air bag cushion 10 and the rear air bag cushion 20 when the front air bag cushion 10 and the rear air bag cushion 20 are unfolded, thereby serving to maintain shapes of the unfolded front air bag cushion 10 and rear air bag cushion 20.

It is desired to restrict movement of the front air bag cushion 10 and the rear air bag cushion 20 to some extent in order to increase a protection function of the front passenger 1 and the rear passenger 2 when the front air bag cushion 10 and the rear air bag cushion 20 are unfolded. To this end, in the roof air bag apparatus 3 for a vehicle according one form of the present disclosure, upper and lower ends of the front air bag cushion 10 and the rear air bag cushion 20 are configured to be connected to each other.

That is, the upper end of the front air bag cushion 10 and the upper end of the rear air bag cushion 20 are sewed and coupled into an upper plate 70 to be connected to each other, and the lower end of the front air bag cushion 10 and the lower end of the rear air bag cushion 20 are sewed and coupled into a lower plate 80 to be connected to each other.

When the upper end of the front air bag cushion 10 and the upper end of the rear air bag cushion 20 are sewed and coupled into the upper plate 70, an upper end of the front tether 50 and an upper end of the rear tether 60 are also sewed and coupled to the upper plate 70 to be integrally coupled to each other.

In addition, when the lower end of the front air bag cushion 10 and the lower end of the rear air bag cushion 20 are sewed and coupled into the lower plate 80, a lower end of the front tether 50 and a lower end of the rear tether 60 are also sewed and coupled to the lower plate 80 to be integrally coupled to each other.

In another form, the roof air bag apparatus further includes an air bag housing 90 in which the front air bag cushion 10 and the rear air bag cushion 20 are accommodated in a folded state, and an air bag cover 110 which simultaneously covers the front air bag cushion 10 and the rear air bag cushion 20 accommodated in the air bag housing 90 and in which a front tear line 111 and a rear tear line 112 each torn by unfolding pressures of the front air bag cushion 10 and the rear air bag cushion 20 are formed.

The roof air bag apparatus 3 may be fixedly installed on the roof of the vehicle. In this form, bolts 120 sequentially penetrate through the air bag cover 110, the lower plate 80, the upper plate 70, and the air bag housing 90 and are then fastened to a roof cross panel (roof cross member) 5 coupled to a roof panel 4, such that the roof air bag apparatus 3 for a vehicle is fixedly installed on the roof of the vehicle.

When the front tear line 111 and the rear tear line 112 are torn by the unfolding pressures of the front air bag cushion 10 and the rear air bag cushion 20, the air bag cover 110 is separated into an outer side portion connected to the air bag housing 90 and an intermediate portion fixed by the bolts 120, and the front air bag cushion 10 and the rear air bag cushion 20 perform an unfolded operation while falling down through a space between the outer portion and the intermediate portion separated from each other.

Figure 5:
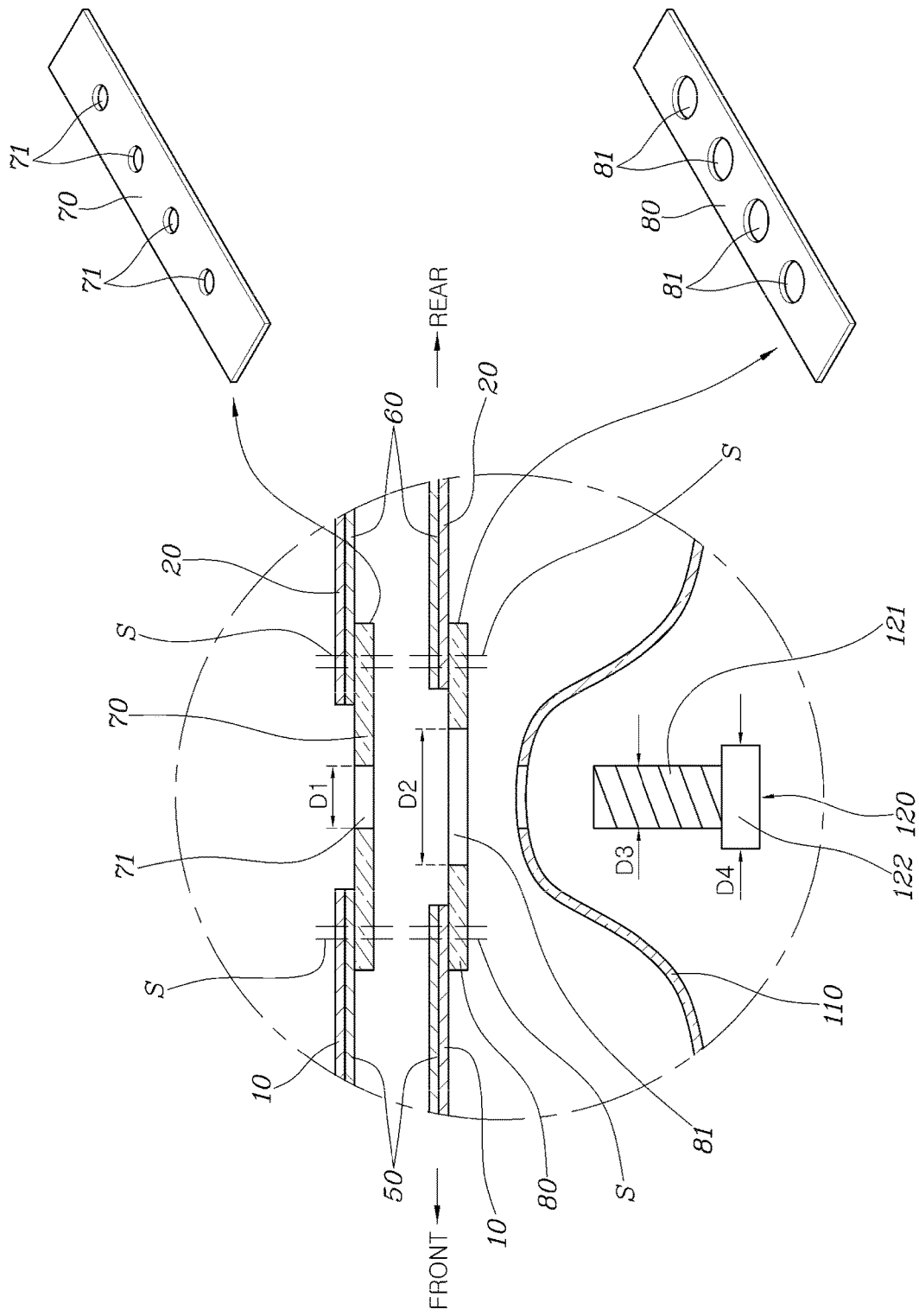
FIG. 5 is a view for describing an upper plate and a lower plate according to another form of the present disclosure.

As illustrated in FIG. 5, bolt holes 71 and 81 through which the bolts 120 penetrate are formed in the upper plate 70 and the lower plate 80, respectively, a diameter D1 of the bolt hole 71 formed in the upper plate 70 is larger than a diameter D3 of a screw portion 121 of the bolt 120 and is smaller than a diameter D4 of a head portion 122 of the bolt 120, and a diameter D2 of the bolt hole 81 formed in the lower plate 80 is larger than the diameter D4 of the head portion 122 of the bolt 120.

In FIG. 5, reference characteristics "S" denotes a sewing coupling portion.

Figure 2:
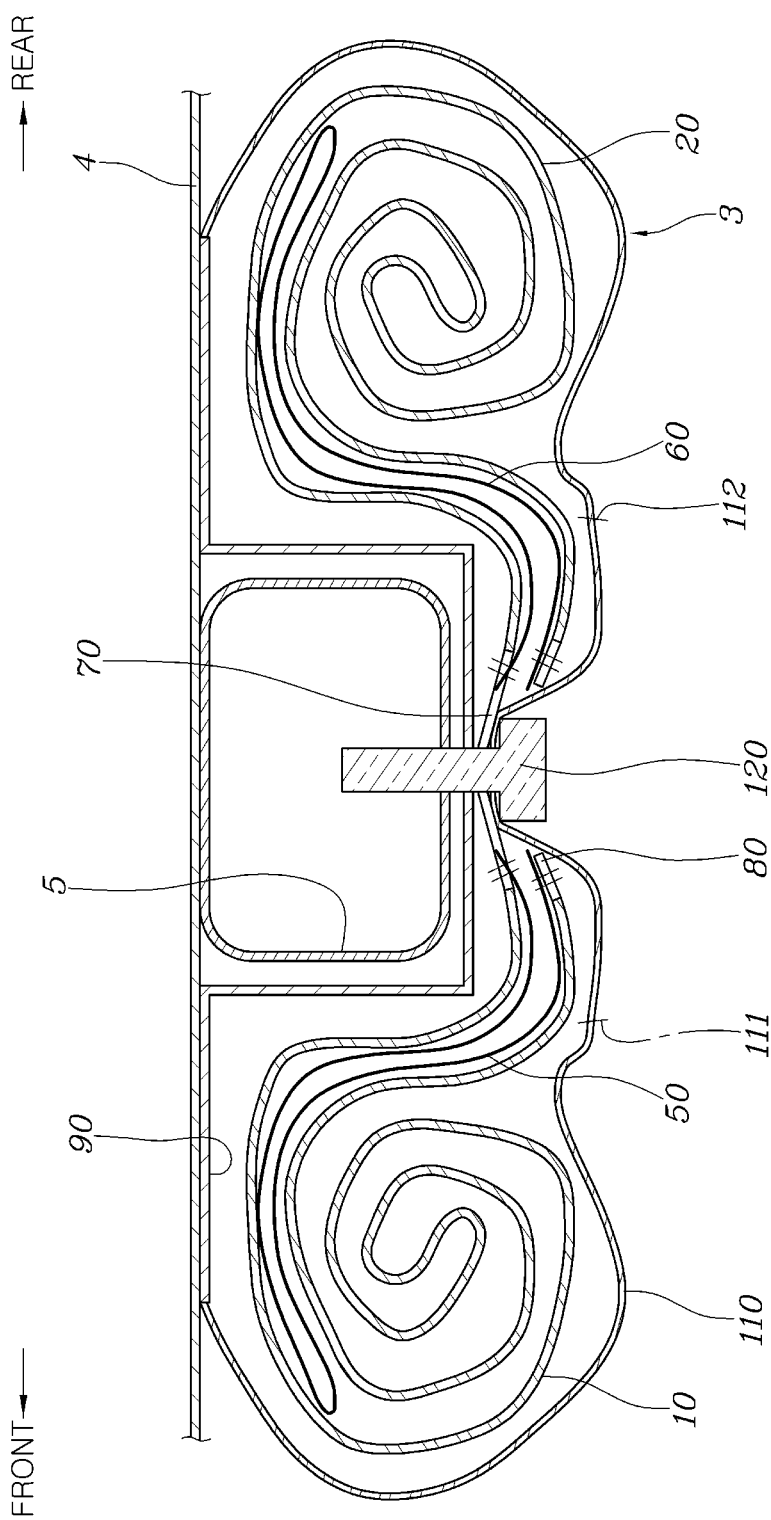
FIG. 2 is an enlarged view of the roof air bag apparatus in FIG. 1.
Figure 3:
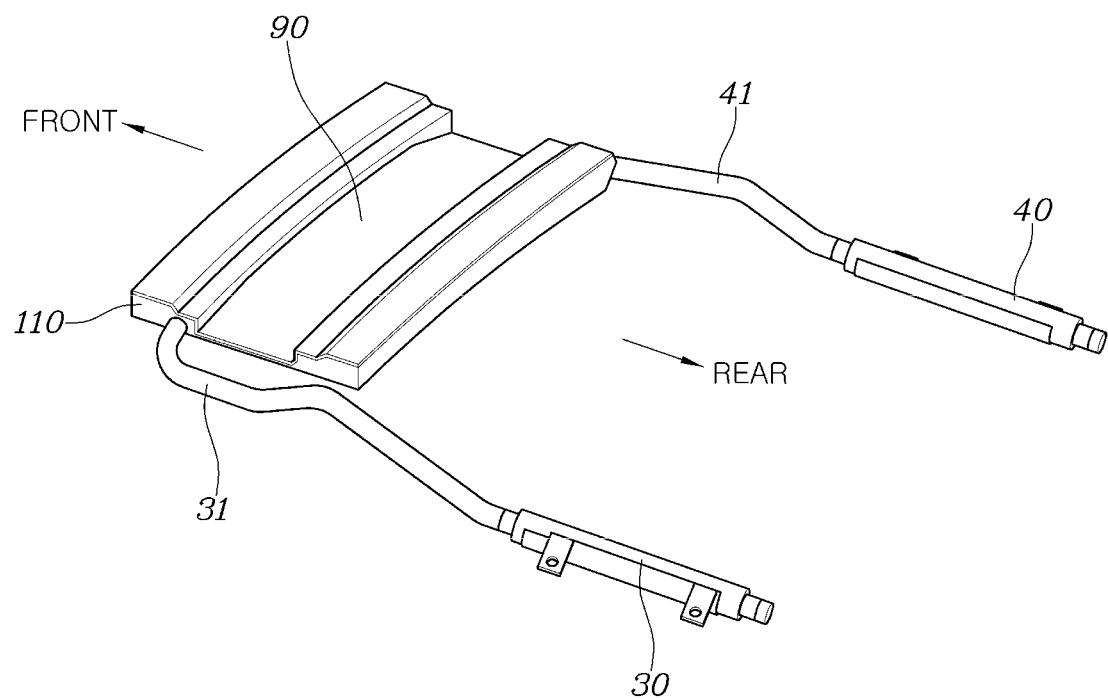
FIG. 3 is a perspective view illustrating an assembled state of an air bag housing, an air bag cover, a front inflator and a rear inflator according to one form of the present disclosure.
Figure 4:
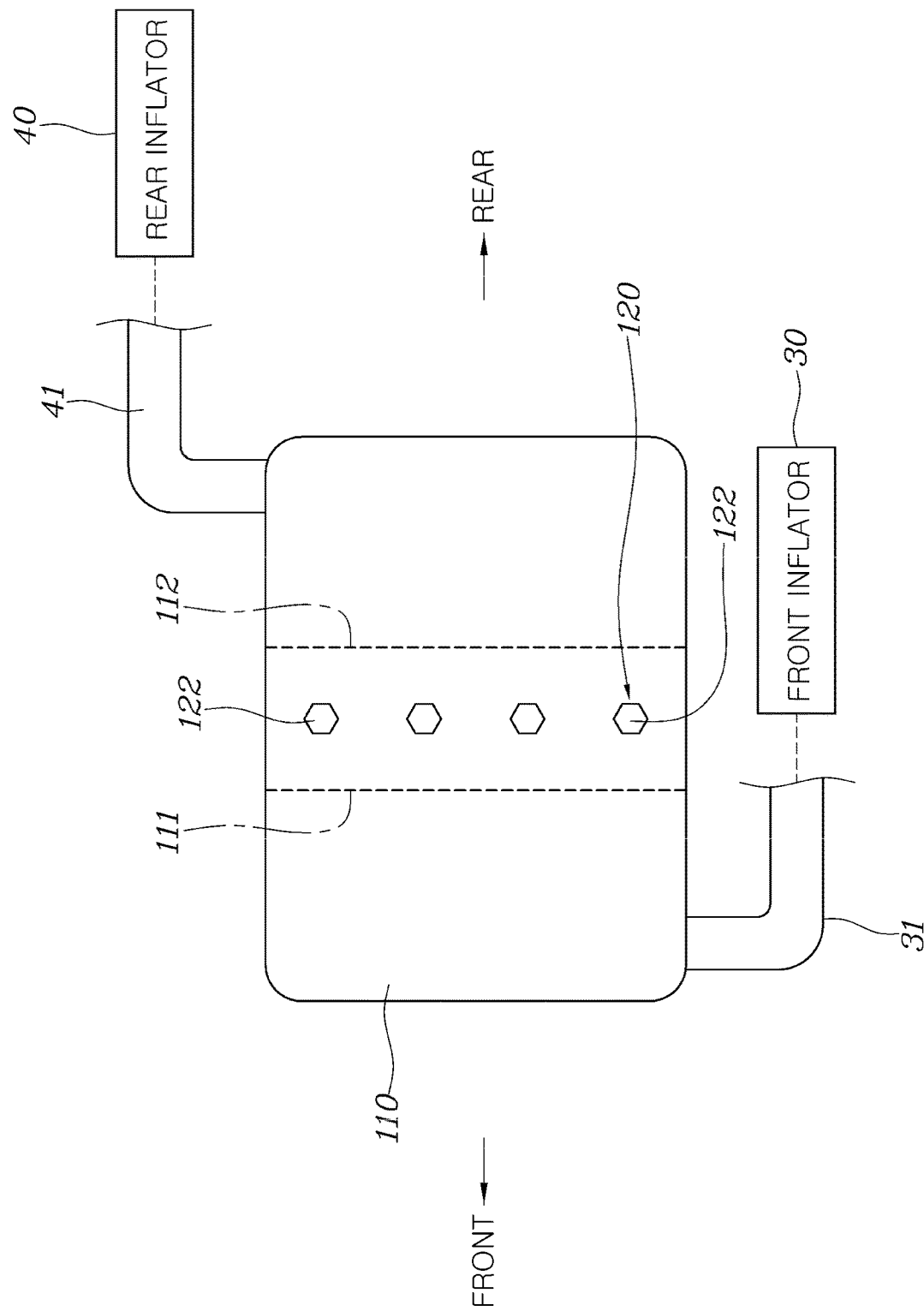
FIG. 4 is a bottom view of FIG. 2.

Therefore, when the front inflator 30 and the rear inflator 40 are exploded or ignited due to an accident in a state in which the front air bag cushion 10 and the rear air bag cushion 20 are folded and accommodated in the air bag housing 90 as illustrated in FIGS. 1 and 2, such that the air bag gases are generated, the front air bag cushion 10 and the rear air bag cushion 20 are unfolded by pressures of the air bag gases, and the front tear line 111 and the rear tear line 112 of the air bag cover 110 start to be torn by the unfolding pressures of the front air bag cushion 10 and the rear air bag cushion 20.

When the front tear line 111 and the rear tear line 112 of the air bag cover 110 are torn, the lower plate 80 is separated downward while falling from the bolts 120. Therefore, the lower ends of the front air bag cushion 10 and the rear air bag cushion 20 are unfolded by the pressures of the air bag gases while being located in a space between the front passenger 1 and the rear passenger 2 in the face-to-face mode by self-weights of the front air bag cushion 10 and the rear air bag cushion 20.

In this case, the upper plate 70, the upper end of the front air bag cushion 10, the upper end of the rear air bag cushion 20, and the air bag housing 90 are maintained in a state in which they are fixed to the roof cross panel 5 by the bolts 120.

Figure 6:
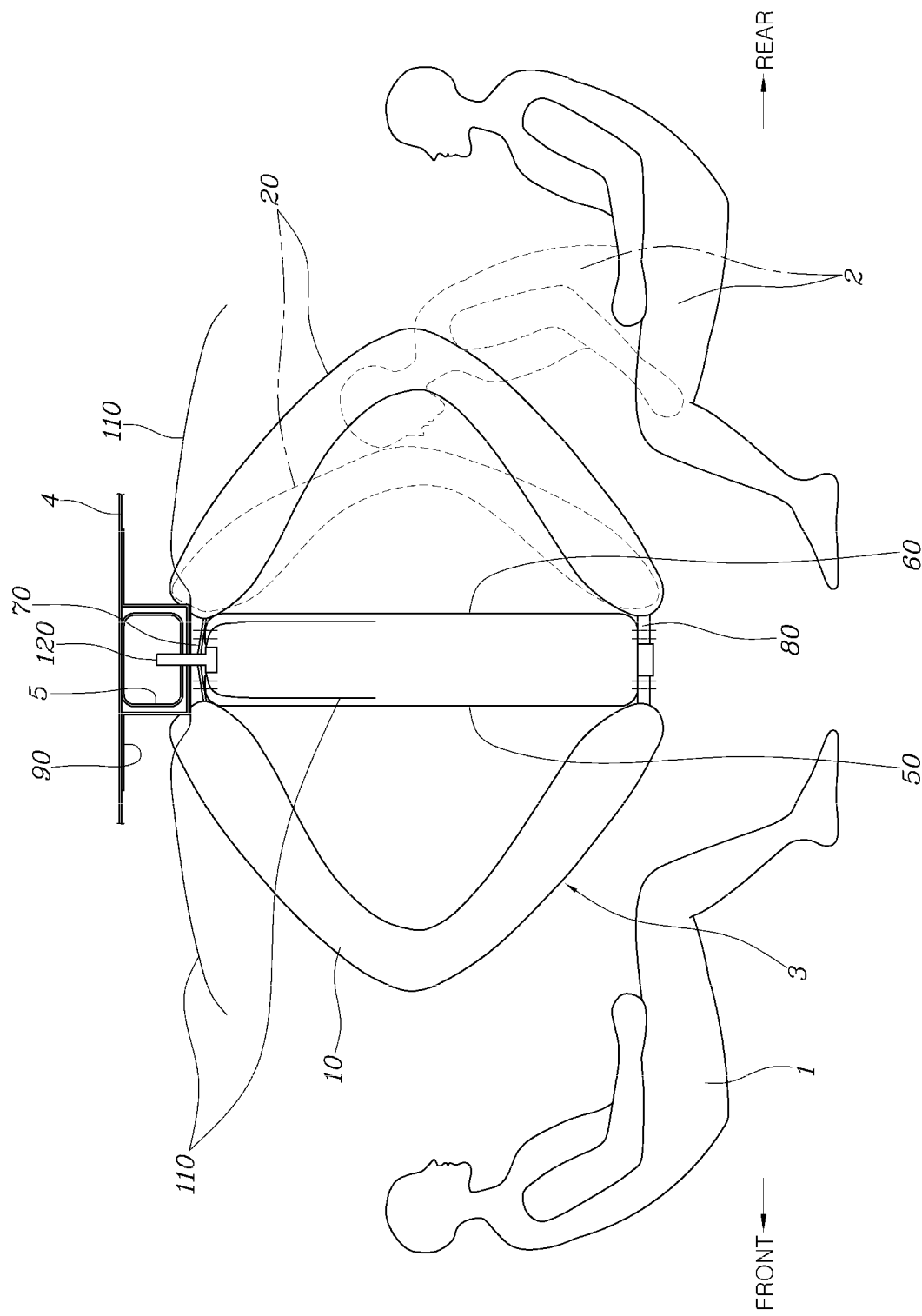
FIG. 6 is a view illustrating a state in which the front air bag cushion and the rear air bag cushion of FIG. 1 are unfolded.

Meanwhile, when the front air bag cushion 10 and the rear air bag cushion 20 are located and unfolded into the space between the front passenger 1 and the rear passenger 2 in the face-to-face mode as illustrated in FIG. 6, the front passenger 1 and the rear passenger 2 are in contact with the unfolded front air bag cushion 10 and rear air bag cushion 20, respectively, and impact forces are absorbed by the front air bag cushion 10 and the rear air bag cushion 20, such that the front passenger 1 and the rear passenger 2 are protected.

That is, when the front passenger 1 is in contact with the unfolded front air bag cushion 10, the front air bag cushion 10 protects the front passenger 1 by absorbing the impact force while an outer shape of the front air bag cushion 10 is changed. In this case, the rear air bag cushion 20 is not pushed to the rear at which the rear passenger 2 exists, such that occurrence of an injury to the rear passenger 2 due to the push of the rear air bag cushion 20 to the rear may be prevented.

In addition, when the rear passenger 2 is in contact with the unfolded rear air bag cushion 20, the rear air bag cushion 20 protects the rear passenger 2 by absorbing the impact force while an outer shape of the rear air bag cushion 20 is changed. In this case, the front air bag cushion 10 is not pushed to the front at which the front passenger 1 exists, such that occurrence of an injury to the front passenger 1 due to the push of the front air bag cushion 10 to the front may be prevented.

Figure 7:
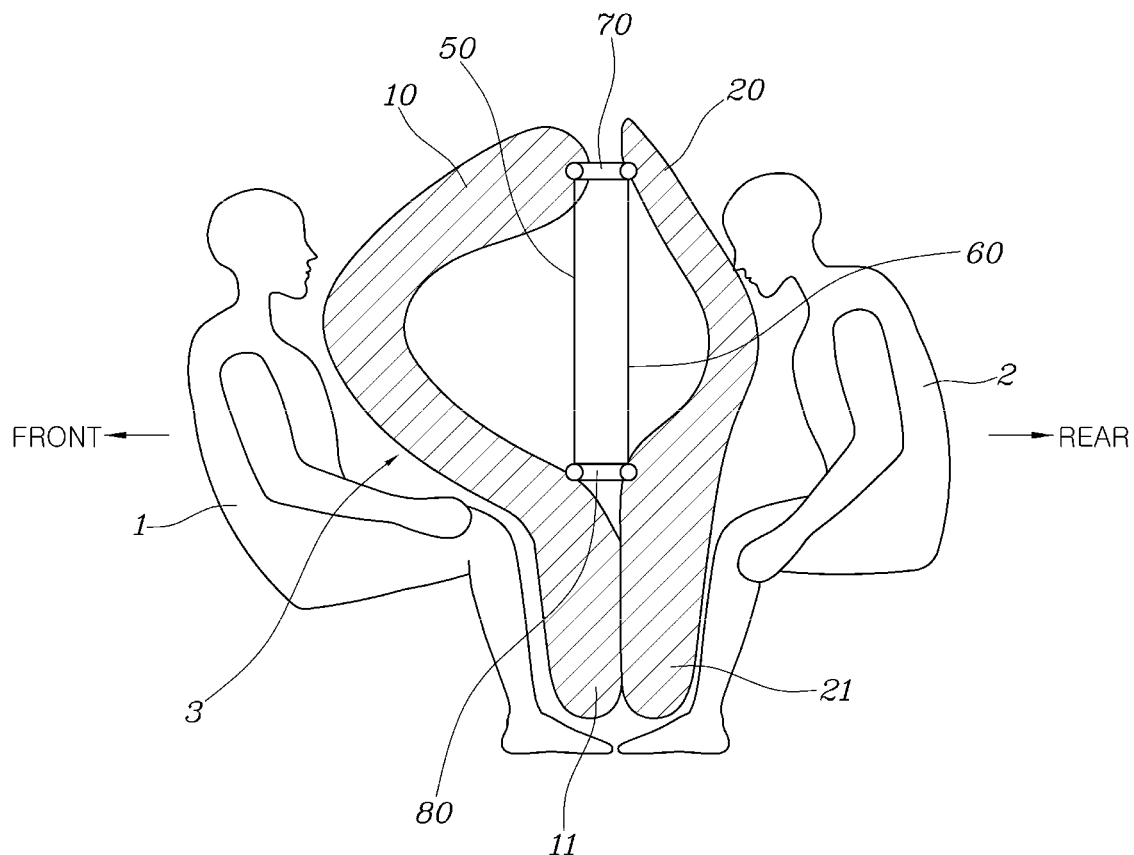
FIG. 7 is a view describing the front air bag cushion and the rear air bag cushions which are provided with a front leg protecting portion and a rear leg protecting portion, respectively, according to another form of the present disclosure.

In another form, the roof air bag apparatus 3 further includes a front leg protecting portion 11 unfolded to extend downwardly from the lower end of the front air bag cushion 10 and a rear leg protecting portion 21 unfolded to extend downwardly from the lower end of the rear air bag cushion 20, on the basis of a state in which the front air bag cushion 10 and the rear air bag cushion 20 are unfolded, as illustrated in FIG. 7. In particular, the front leg protecting portion 11 and the rear leg protecting portion 21 are unfolded into a space between knees of the front passenger 1 and the rear passenger 2 to protect the knees and shins of the passengers.

In another form of the present disclosure, the bolts 120 fastened to the roof cross panel 5 become cushion hinge portions of the unfolded front air bag cushion 10 and rear air bag cushion 20, and when the front passenger 1 is in contact with the front air bag cushion 10 or the rear passenger 2 is in contact with the rear air bag cushion 20 at the time of collision of the vehicle, the front air bag cushion 10 and the rear air bag cushion 20 absorb collision energy while rotating around the cushion hinge portions. As a result, tension of upper end portions is minimized, such that a protection function of the passengers may be further enhanced.

As described above, in the roof air bag apparatus for a vehicle according some forms of the present disclosure, the roof air bag cushion protecting the passenger is configured to be separated into the front air bag cushion 10 and the rear air bag cushion 20, the front air bag cushion 10 and the rear air bag cushion 20 are located and unfolded into the space between the front passenger 1 and the rear passenger 2 in the face-to-face mode at the time of occurrence of the accident, the front passenger 1 is in contact with the unfolded front air bag cushion 10 and the impact force is absorbed by the front air bag cushion 10, such that the front passenger 1 is protected, and the rear passenger 2 is in contact with the unfolded rear air bag cushion 20 and the impact force is absorbed by the rear air bag cushion 20, such that the rear passenger 2 is protected. Therefore, the roof air bag apparatus for a vehicle according exemplary forms of the present disclosure may more efficiently protect the front passenger 1 and the rear passenger 2 in the fact-to-face mode.

In addition, when the front passenger 1 is in contact with the unfolded front air bag cushion 10, a phenomenon in which the rear air bag cushion 20 is pushed to the rear at which the rear passenger 2 exists does not occur, such that the occurrence of the injury to the rear passenger 2 due to the push of the rear air bag cushion 20 may be prevented, and when the rear passenger 2 is in contact with the unfolded rear air bag cushion 20, a phenomenon in which the front air bag cushion 10 is pushed to the front at which the front passenger 1 exists does not occur, such that the occurrence of the injury to the front passenger 1 due to the push of the front air bag cushion 10 may be prevented.

Although the present disclosure has been shown and described with respect to the exemplary forms, it will be apparent to those having ordinary skill in the art that the present disclosure may be variously modified and altered without departing from the spirit and scope of the present disclosure.

What is claimed is:
1. A roof air bag apparatus for a vehicle, the roof air bag apparatus comprising:

a front air bag cushion and a rear air bag cushion respectively mounted on a roof of the vehicle in a folded state, and configured to be unfolded between a front passenger and a rear passenger by receiving pressures of air bag gases;

an upper plate and a lower plate which are coupled to connect an upper end of the front air bag cushion and an upper end of the rear air bag cushion and a lower end of the front air bag cushion and a lower end of the rear air bag cushion to each other, respectively;

an air bag housing in which the front air bag cushion and the rear air bag cushion are accommodated in the folded state; and an air bag cover configured to simultaneously cover the front air bag cushion and the rear air bag cushion accommodated in the air bag housing, wherein a front tear line and a rear tear line each torn by unfolding pressures of the front air bag cushion and the rear air bag cushion are formed on the air bag cover, wherein bolts sequentially penetrate through the air bag cover, the lower plate, the upper plate, and the air bag housing, and are then fastened to a roof cross panel coupled to a roof panel, such that the roof air bag apparatus is fixedly installed on the roof of the vehicle, and wherein when the front passenger and the rear passenger are seated so as to face to each other in the vehicle and an accident occurs, the unfolded front air bag cushion is configured to contact and protect the front passenger, and the unfolded rear air bag cushion is configured to contact and protect the rear passenger.

2. The roof air bag apparatus of claim 1, wherein the front air bag cushion and the rear air bag cushion are unfolded at a same time.

3. The roof air bag apparatus of claim 1, further comprising: a front inflator and a rear inflator configured to respectively generate the air bag gases supplied to the front air bag cushion and the rear air bag cushion, wherein the front inflator and the rear inflator are fixedly mounted on the roof of the vehicle and are configured to be connected to the front air bag cushion and the rear air bag cushion through a front hose and a rear hose, respectively.

4. The roof air bag apparatus of claim 3, further comprising:

a front tether coupled to the front air bag cushion and configured to maintain a shape of the front air bag cushion when the front air bag cushion is unfolded; and a rear tether coupled to the rear air bag cushion and configured to maintain a shape of the rear air bag cushion when the rear air bag cushion is unfolded.

5. The roof air bag apparatus of claim 4, wherein the front tether and the rear tether are tethers formed of a fabric material.

6. The roof air bag apparatus of claim 1, wherein the upper and lower ends of the front air bag cushion and the rear air bag cushion are configured to be connected to each other.

7. The roof air bag apparatus of claim 1, wherein bolt holes through which the bolts penetrate are formed in the upper plate and the lower plate, respectively, a diameter of the bolt holes formed in the upper plate is greater than a diameter of a screw portion of the bolts and is less than a diameter of a head portion of the bolts, and a diameter of the bolt holes formed in the lower plate is greater than the diameter of the head portion of the bolts.

8. The roof air bag apparatus of claim 1, further comprising:

a front leg protecting portion configured to be unfolded and extend downwardly from the lower end of the front air bag cushion and a rear leg protecting portion configured to be unfolded and extend downwardly from the lower end of the rear air bag cushion, in a state in which the front air bag cushion and the rear air bag cushion are unfolded, wherein the front leg protecting portion and the rear leg protecting portion are unfolded into a space between knees of the front passenger and the rear passenger to protect the knees and shins of the front and rear passengers.

9. The roof air bag apparatus of claim 1, wherein when a front inflator and a rear inflator are exploded or ignited due to an accident in a state in which the front air bag cushion and the rear air bag cushion are folded and accommodated in the air bag housing, and thus the air bag gases are generated, the front air bag cushion and the rear air bag cushion are unfolded by pressures of the air bag gases, the front tear line and the rear tear line of the air bag cover start to be torn by unfolding pressures of the front air bag cushion and the rear air bag cushion, and at a same time, the lower plate is separated while falling from the bolts;

when the lower plate falls from the bolts, the lower end of the front air bag cushion, the lower end of the rear air bag cushion, and the lower plate are unfolded into a space between the front passenger and the rear passenger by self-weights of the front air bag cushion, the rear air bag cushion, and the lower plate; and the front passenger and the rear passenger are protected by coming into contact with the unfolded front air bag cushion and rear air bag cushion, respectively.

10. The roof air bag apparatus of claim 9, wherein when the front passenger is in contact with the unfolded front air bag cushion, the front air bag cushion is configured to absorb an impact force while an outer shape of the front air bag cushion is changed, and a phenomenon in which the rear air bag cushion is pushed to a rear at which the rear passenger exists does not occur.

11. The roof air bag apparatus of claim 9, wherein when the rear passenger is in contact with the unfolded rear air bag cushion, the rear air bag cushion is configured to absorb an impact force while an outer shape of the rear air bag cushion is changed, and a phenomenon in which the front air bag cushion is pushed to a front at which the front passenger exists does not occur.

12. The roof air bag apparatus of claim 1, wherein the bolts fastened to the roof cross panel become cushion hinge portions of the unfolded front air bag cushion and rear air bag cushion, and when the front passenger is in contact with the front air bag cushion or the rear passenger is in contact with the rear air bag cushion at a time of collision of the vehicle, the front air bag cushion and the rear air bag cushion are configured to absorb collision energy while rotating around the cushion hinge portions, such that tension of upper end portions is reduced.

* * * * *